No. 884,647. PATENTED APR. 14, 1908.
J. EDENS.
CASING FOR MECHANICAL MOVEMENTS.
APPLICATION FILED DEC. 1, 1905.
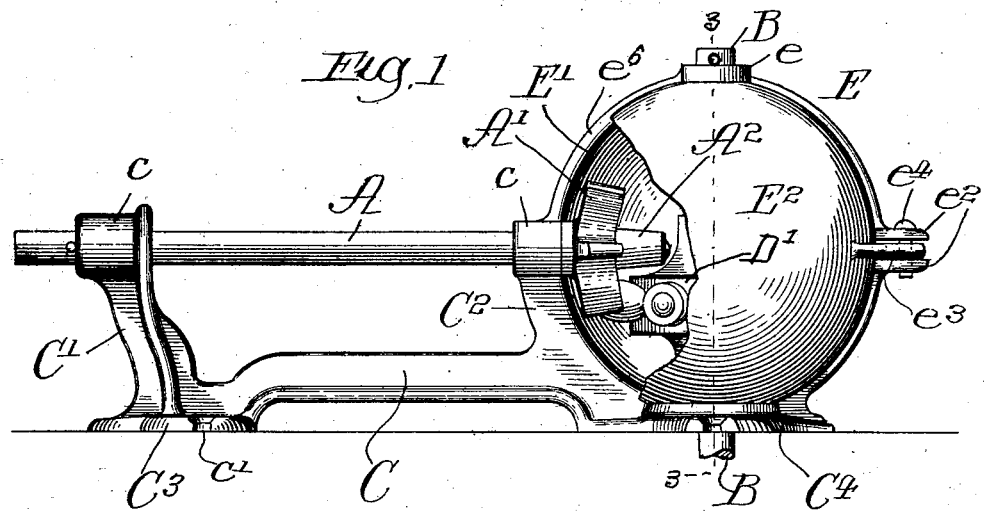
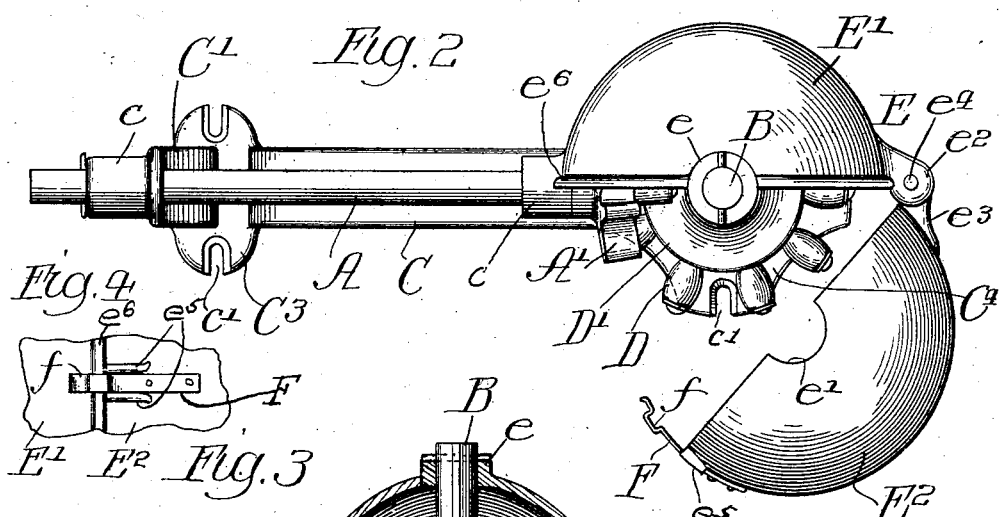
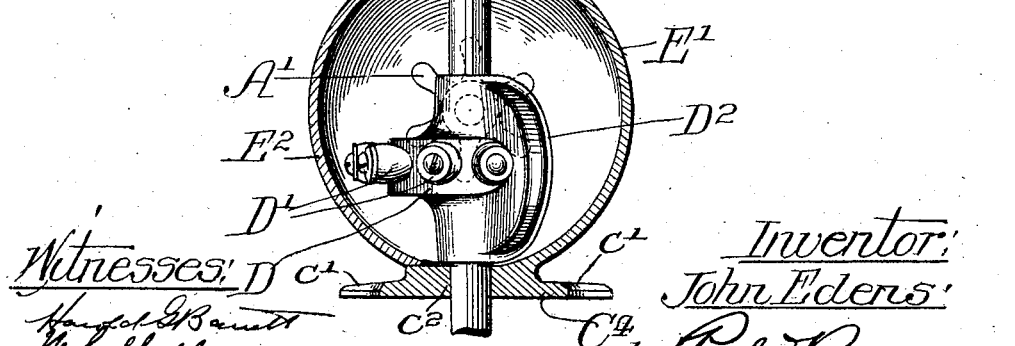

UNITED STATES PATENT OFFICE.

JOHN EDENS, OF DAVENPORT, IOWA, ASSIGNOR TO H. F. BRAMMER MANUFACTURING COMPANY, OF DAVENPORT, IOWA, A CORPORATION OF IOWA.

CASING FOR MECHANICAL MOVEMENTS.

No. 884,647.  Specification of Letters Patent.  Patented April 14, 1908.

Application filed December 1, 1905. Serial No. 289,836.

*To all whom it may concern:*

Be it known that I, JOHN EDENS, a citizen of the United States, of Davenport, in the county of Scott and State of Iowa, have invented certain new and useful Improvements in Casings for Mechanical Movements; and I do hereby declare that the following is a full, clear, and exact description thereof, reference being had to the accompanying drawings, and to the letters of reference marked thereon, which form a part of this specification.

This invention relates to a novel bearing support and casing for a mechanical movement of that class designed to transmit motion through suitable gears from one shaft to a second shaft that is disposed transversely thereto, the casing being designed to inclose the intermeshing transmitting gear of the movement.

My improvement is herein shown as adapted to that class of mechanical movements in which the continuous rotary motion of the driving shaft is translated through the intermeshing gears into a rotary reciprocatory motion of a driving shaft that is disposed at right angles to the driven-shaft, an example of which is shown in the prior patent to John Schroeder, No. 535,465, issued March 12th, 1895.

As shown in the drawings:—Figure 1 is a side elevation, with parts broken away, of my novel bearing support and casing adapted to one form of mechanical movement, part of the casing being broken away. Fig. 2 is a top plan view thereof with the casing open exposing a portion of the gearing of the movement. Fig. 3 is a vertical section, taken on line 3—3 of Fig. 1. Fig. 4 is a detail illustrating the manner of closing the casing.

As shown in said drawings, A designates a horizontal, continuously rotative shaft, and B a vertical shaft that is driven from the shaft A.

C designates a bearing support or frame having upwardly extending arms $C^1$ $C^2$ in which are formed horizontal bearings $c$ $c$ for said shaft A. The said frame is formed to provide at its ends base-flanges $C^3$ by which the frame is attached to its support, as by screws passing through the screw-holes $c^1$, and the inner end of the frame is provided with a vertical bearing $c^2$ for the vertical shaft. The transmitting gear of the mechanical movement may consist of a beveled gear $A^1$ on the shaft A and a vertically movable sleeve or hub $D^1$ that is splined to the shaft B and is provided with radial teeth D meshing with the beveled gear $A^1$, and with vertical cams $D^2$ which are engaged by the inner extended end $A^2$ of the shaft A, said parts being constructed and operating like the construction shown in said Schroeder patent referred to. The said meshing gears of the movement are inclosed by a casing indicated as a whole by E, which is of generally spherical contour as herein shown. Said casing comprises two parts $E^1$ $E^2$ which are separated in a vertical plane. One of said parts, the part $E^1$, as herein shown, is made stationary and is formed to provide an upper, vertical bearing for the shaft B in line with the lower bearing $c^2$ before referred to, while the other part $E^2$ of the casing is movable so that it may be opened or separated from the stationary part to expose the meshing gears of the movement.

As herein shown, the stationary part $E^1$ is made integral with the front part of the bearing support or frame C, it being formed integral with the base flange and the forward bearing arm $C^2$ of the frame. The stationary part of said casing embodies substantially one-half of a sphere, it being located on one side of the vertical longitudinal axis of the shaft B. The stationary part is provided at its top with a bearing boss $e$ for the upper end of the shaft which is located over and in vertical alinement with the lower bearing $c^2$ in the base-flange $C^4$ of the inner end of the supporting frame C, as before stated. The said bearing boss $e$ extends beyond the margin of the stationary member of the casing and the movable member $E^2$ is provided with a curved recess $e^1$ that is adapted to fit about the bearing boss $e$, when the said member $E^2$ is in its closed position.

The movable member of the casing is shown as hinged to the stationary member thereof at the front end of the device by means of overlapping, horizontal hinge-lugs $e^2$ $e^3$ of the stationary and swinging members, respectively, connected by a vertical pintle $e^4$, as shown in Figs. 1 and 2. Said swinging member is locked into closed position by means of a spring-latch F that is attached to the swinging member $E^2$ between the upper and lower lugs $e^5$ $e^5$, and said latch is formed at its free end to constitute a recess $f$ which engages a rib $e^6$ on the margin of the stationary member, as more clearly shown in Fig. 4. The said swinging and stationary members of the casing meet in abutting relation, and, as herein shown, in the plane of the axis of the shaft B.

The casing herein shown is exceedingly simple in its construction and provides means whereby the gear of the movement may be inclosed and protected, while, at the same time, permitting ready access thereto when desired. It will be observed that the swinging member $E^2$ is entirely free from the bearing of either of the shafts so that it may be opened to expose the gear for inspection without disturbing the shaft bearings.

It is obvious that the bearing frame and casing may be applied to other forms of mechanical movement than that herein shown, the type shown being merely illustrative of one adaptation of my invention.

I claim as my invention:—

A combined bearing frame and gear casing comprising a bearing frame provided with a horizontal bearing and provided at its inner end with vertically alined bearings, said inner end of the frame being formed to provide one member of the casing and arranged at its lower side for fixed connection with a part upon which the bearing frame and casing are supported, the other member of the casing comprising a swinging part which is hinged to the frame and meets the casing member integral with the frame in the approximate plane of the axes of the horizontal and vertical bearings, and means for locking the swinging member in its closed position.

In testimony, that I claim the foregoing as my invention I affix my signature in presence of two witnesses, this 25 day of November A. D. 1905.

JOHN EDENS.

Witnesses:
H. G. BRAUNLICH,
O. H. SCHRUM.